United States Patent
Weiser

[11] Patent Number: 6,106,357
[45] Date of Patent: Aug. 22, 2000

[54] DEER CALL

[75] Inventor: Mark J. Weiser, Evans City, Pa.

[73] Assignee: EBSCO Industries, Inc., Birmingham, Ala.

[21] Appl. No.: 09/293,280

[22] Filed: Apr. 16, 1999

[51] Int. Cl.[7] .................................................. A63H 5/00
[52] U.S. Cl. ......................... 446/207; 446/208; 446/209
[58] Field of Search .................................... 446/207, 208, 446/209

[56] References Cited

U.S. PATENT DOCUMENTS

| | | | |
|---|---|---|---|
| 4,940,451 | 7/1990 | Leady | 446/207 |
| 4,950,201 | 8/1990 | Sceery | 446/207 |

Primary Examiner—Urszula M. Cegielnik
Attorney, Agent, or Firm—Robert J. Veal; Chris Holland; Burr & Forman

[57] ABSTRACT

A game call having an externally actuated mechanical sound adjustment member for varying the sound emitted from the game call. The game call has a housing rotatably engaged with a reed assembly, such that rotation of the reed assembly relative to the housing causes a sound adjustment member to exert a varied force upon a sound producing reed. The insertion of the sound adjustment member into the housing additionally functions to secure the reed assembly to the housing by partially restricting rotational movement of the reed assembly relative to the housing, such that a retaining member positioned in an annular groove on the reed assembly cannot rotate to engage an exit channel, thereby detaching the reed assembly from the housing.

5 Claims, 2 Drawing Sheets

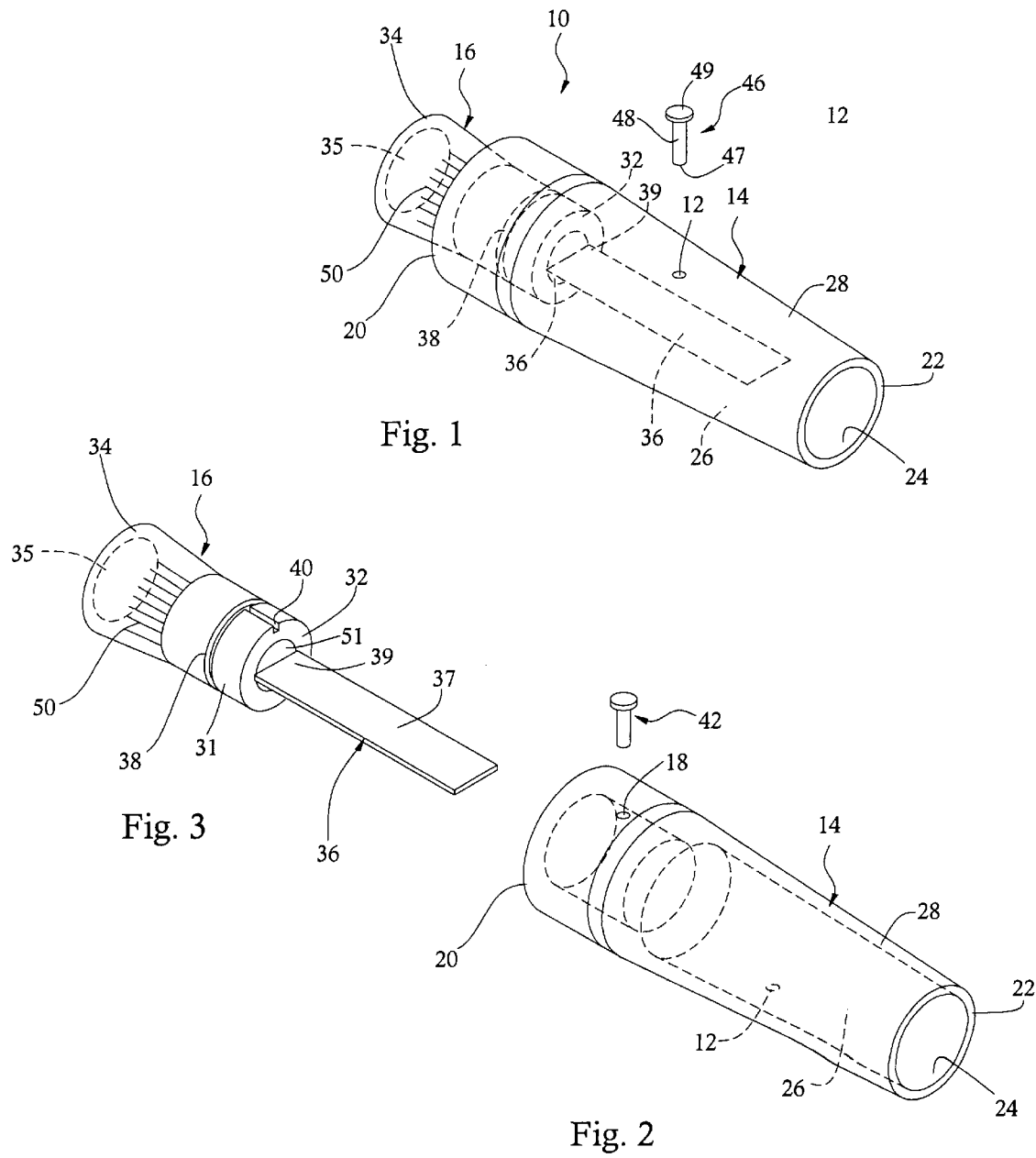

DEER CALL

FIELD OF THE INVENTION

The present invention relates to the field of game calling devices. More particularly, the present invention relates to a game calling device capable of emitting sounds having a varied pitch, intensity, tone, and inflection. With even greater particularity, the present invention relates to a reed-type game calling device wherein the sound emitted from the call can be mechanically varied by the user.

BACKGROUND OF THE INVENTION

The utilization of game calling devices to attract animals is old in the relevant art, as hunters and callers have for years utilized a variety of game calls to attract numerous species of animals. Reed and band type calls are common for nearly all species, however, both are susceptible to variations in temperature and often become in-operable in harsh weather conditions. Each individual species of animal also generally requires the use of a specific call designed to create call sounds closely imitating those of the particular species, as the range in pitch and spectral content of differing species is typically outside the capabilities of a single animal call. Additionally, numerous calls are often necessary to imitate animals within a particular species, as a particular animal's age and sex, along with the season, can dramatically affect the sounds typically emitted by the animal. In the White Tail Deer species, for example, the sounds made by a fawn as opposed to a mature doe are completely distinct and typically require the use of multiple calls to closely imitate the natural sounds emitted by both animals. White Tail bucks, which emit completely different sounds from those of does and fawns, would require the use of yet another call to accurately imitate the natural sounds.

The manufacturers of game calls have attempted to remedy the requirement of multiple calls for various species by manufacturing interchangeable type game calls. These particular game calls can be disassembled, such that the sound emission elements of the game call can be removed and replaced with alternative sound emission elements designed to emit different game sounds. In the common reed-type game calls, the call typically held within a two piece separable housing, is disassembled such that the sound emitting reed can be interchanged with an alternative reed designed for a different game sound. The disassemble and interchange process, although effective in creating varied game sounds, is nonetheless impractical for most call users. Hunters in particular, while on the hunt generally do not have the time or facilities required to disassemble and interchange game call parts to obtain the proper natural sounds of a particular animal encountered in the field. Additionally, the two piece housing of the reed-type calls is prone to unexpected separation, which often results in damage to or loss of the call.

In addition to the interchangeable-type calls, game call manufacturers have also modified typical game calls with the addition of a resonance tube in an attempt to create a game call capable of emitting various call sounds. This type of game call, although effective in somewhat varying the sound emitted from the call, is nonetheless still limited to the spectral capability of the reed within the game call.

SUMMARY OF THE INVENTION

Accordingly, it is an object of the present invention to provide a game calling device capable of imitating call sounds across a broad spectrum of animal species utilizing a single reed. It is a further object of the present invention to provide a reed-type game call wherein the intensity, tone, inflection, and pitch of the sound emitted by the reed can be mechanically varied by the user. Further, it is an object of the present invention to provide a variable pitch game calling device which is reliable and operable under various weather conditions. Even further, it is an object of the present invention to provide for a variable pitch game call having a mechanism for reliably securing the call housing together to avoid loss or damage to the call.

BRIEF DESCRIPTION OF THE DRAWINGS

A device/apparatus embodying the features of the present invention is depicted in the accompanying drawings, which form a portion of this disclosure, wherein:

FIG. 1 is a perspective view of the apparatus;

FIG. 2 is a perspective view of the tubular housing;

FIG. 3 is a perspective view of the reed assembly;

DETAILED DESCRIPTION OF THE PREFERRED EMBODIMENT

Figure 4:
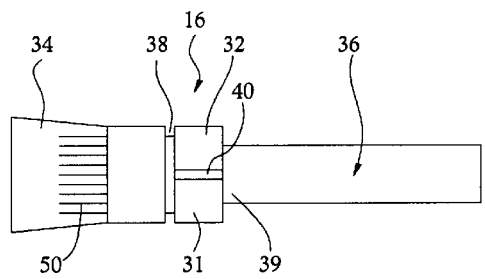
FIG. 4 is a side elevational view of the reed assembly.
Figure 5:
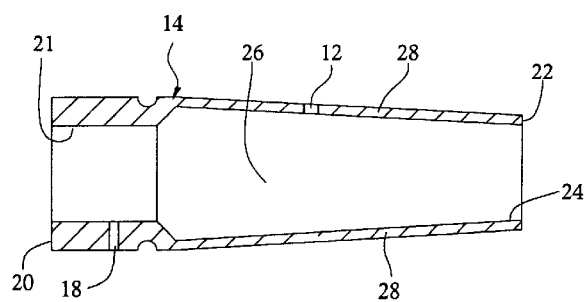
FIG. 5 is a sectional view of the tubular housing.
Figure 6:
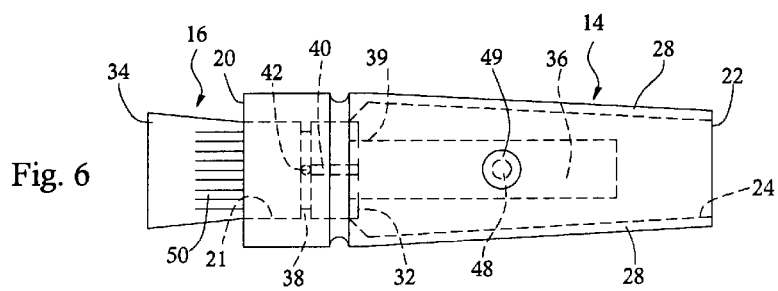
FIG. 6 is a side elevational view of the assembled game call.
Figure 7:
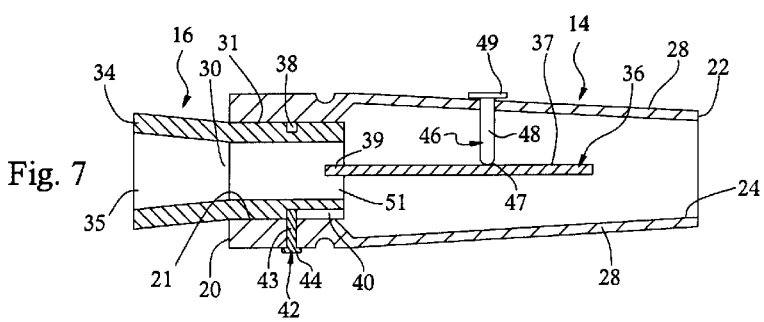
FIG. 7 is a sectional view of the assembled game call.

Referring to the drawings for a better understanding of the principles of operation and structure of the invention, FIG. 1 generally illustrates game call 10. Game call 10 utilizes two primary elements: reed assembly 16, as shown in FIG. 3, and cylindrical housing 14, as shown in FIG. 2. Upon assembling game call 10, as shown in FIG.'s 6 & 7, reed assembly 16 is rotationally secured within housing 14, such that reed assembly 16 is partially rotatable with respect to housing 14.

Housing 14 includes receiving end 20, mouthpiece end 22, and is connected therebetween by annular wall 28 forming resonance chamber 26 therein. Receiving end 20 is substantially circular in cross-section and is in fluid communication with resonance chamber 26 and includes bore 18 formed in annular wall 28 proximate receiving end 20. Mouthpiece end 22, positioned opposite receiving end 20, includes opening 24 in fluid communication with resonance chamber 26 and receiving end 20. Annular wall 28 further includes bore 12 formed therein approximately equidistant from mouthpiece end 22 and receiving end 20.

Reed assembly 16 includes handle end 34 and reed supporting end 32 with a partially hollow central portion 30 occupying the area disposed between, such that fluid communication between reed supporting end 32 and handle end 34 is possible. Proximate handle end 34, partially hollow central portion 30 meets the ambient atmosphere via handle end opening 35. Reed supporting end 32 includes sound emitting reed 36 having upper surface 37. Partially hollow central portion 30 is in fluid communication with reed supporting end 32 via air passageway 51 positioned proximate reed base 39.

Attachment of reed assembly 16 and housing 14 to form game call 10 requires the insertion of reed supporting end 32 of reed assembly 16 into receiving end 20 of housing 14, such that outer surface 31 of reed assembly 16 frictionally engages inner surface 21 of housing 14. Subsequent to insertion of reed assembly 16 into receiving end 20, game call 10 is secured together as a unitary apparatus. Reed supporting end 32 of reed assembly 16 includes longitudinal entrance channel 40 intersecting circumscribing annular groove 38. Shaft portion 43 of retaining pin 42 extends through bore 18 in housing 14 and slidably engages entrance channel 40 upon insertion of reed assembly 16 into housing 14. Slidable engagement of retaining pin 42 into entrance channel 40 restricts rotational movement of reed assembly 16 relative to housing 14 and longitudinally directs shaft portion 43 of pin 42 into annular groove 38. Upon entrance of shaft 43 into annular groove 38, longitudinal movement of reed assembly 16 relative to housing 14 is restricted, thereby rotatably securing reed assembly 16 to housing 14 and creating assembled game call 10.

Subsequent to insertion of shaft portion 43 into annular groove 38, game call 10 is assembled; however, rotational movement of reed assembly 16 relative to housing 14 such that shaft portion 43 becomes re-aligned with entrance channel 40 will allow for game call 10 to separate. In order to maintain game call 10 in an assembled state, reed assembly 16 is rotated 180° upon insertion of shaft portion 43 into annular groove 38 and adjustment shaft 48 of adjustment pin 46 is inserted into bore 12 of housing 14. Head portion 49 of adjustment pin 46 remains proximate the exterior of cylindrical wall 28, while shaft portion 48 extends into resonance chamber 26 and distal end 47 contacts upper surface 37 of reed 36 exerting a force upon upper surface 37. Contact with upper surface 37 of reed 36 by distal end 47 partially restricts rotational movement of reed assembly 16, as shown in FIG. 8, such that shaft portion 43 of retaining pin 42 is unable to rotate to a position proximate entrance channel 40, thereby allowing for unwanted separation of game call 10.

Figures 8A, 8B, 8C, 8D:
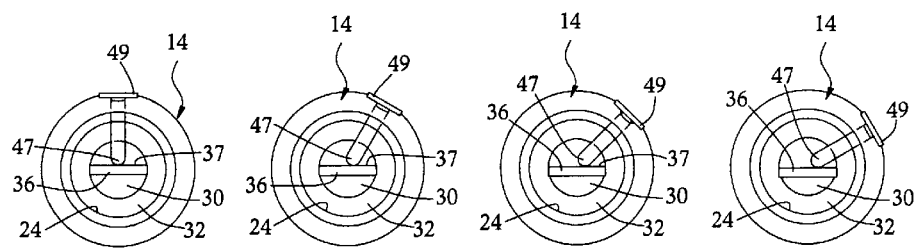
FIGS. 8A–8D are end elevational views of the assembled game call in incrementing radian positions.

In addition to partially restricting rotational motion of reed assembly 16, insertion of adjustment pin 46 also enables game call 10 to emit variable sounds. Partial rotation of reed assembly 16 via handle end 34 causes distal end 47 of adjustment pin 46 to exert a variable force upon upper surface 37 of reed 36 in proportion to the radian position of reed assembly 16 relative to housing 14. The variance in force exerted upon upper surface 37 causes reed 36 to emit variable sounds. Adjustment pin 46 is shown in an initial position in FIG. 8A. Upon incremental rotation of handle end 34 relative to housing 14, as shown in FIGS. 8B–8D, an increasing force is exerted upon upper surface 37 of reed 36, such that the sound emitted from reed 36 is varied according to the specific radian position of reed assembly 16 relative to housing 14. Handle end 34 includes multiple indexed indicia 50 visually indicating the radian position of reed assembly 16 relative to housing 14, such that the operator of game call 10 can accurately determine the proper radian position of reed assembly 16 to acquire the desired sound for the particular game desired.

It is to be understood, however, that the form of the invention shown in this disclosure is a preferred embodiment thereof, and that various changes and modifications may be made therein without departing from the spirit of the invention or scope as defined in the following claims.

What is claimed is:
1. A game call comprising:
 a. an adjustment pin for mechanically varying the emission of sound from said game call, said pin having an elongated shaft portion and a head portion;
 b. a substantially cylindrical housing defining an axial bore, said cylindrical housing having a mouthpiece end, a receiving end, and a bore formed therein for receiving said adjustment pin;
 c. a reed assembly detachably and rotatably inserted within said receiving end of said cylindrical housing, said reed assembly having a reed end and a handle end, said reed end supporting a reed capable of emitting a variable sound in response to passing air and said adjustment member; and
 d. means for rotatably securing said reed assembly within said receiving end of said housing, wherein said means for rotatably securing said reed assembly within said receiving end includes an annular groove positioned proximate said reed end of said reed assembly, an axial entrance channel positioned on said reed end of said reed assembly intersecting said annular groove and extending axially towards said reed, a retaining pin having a head portion and a shaft portion, said retaining pin inserted within said bore such that said shaft portion extends substantially perpendicular through said bore of said housing, such that upon insertion of said reed assembly into said housing, said retaining pin is guided to said annular groove by said entrance channel, such that said reed assembly is rotatable secured within said housing.

2. A variable pitch game call comprising:
 an elongated cylindrical housing, said housing having a mouthpiece end, a receiving end, and an annular wall defining an inner resonance chamber;
 an elongated reed assembly detachably and rotatably inserted within said receiving end, having a reed end and a handle end, said reed end supporting a reed capable of emitting sound in response to passing air within said resonance chamber of said housing;
 means for adjusting the sound emitted from said reed comprising an elongated adjustment member extending substantially perpendicular from said annular wall and contacting the surface of said reed, such that upon partial rotation of said reed assembly relative to said housing, a variable force is exerted upon said reed by said elongated adjustment member; and
 means for rotatably securing said reed assembly within said receiving end of said cylindrical housing including an annular groove circumscribing said reed end of said reed assembly;
 a longitudinal entrance channel positioned on said reed end of said reed assembly, said entrance channel intersecting said annular groove and extending longitudinally, terminating proximate said reed end of said reed assembly; and
 a retaining member extending substantially perpendicular from said annular wall of said housing, such that upon insertion of said reed assembly into said tubular housing, said retaining member is guided to said annular groove by said entrance channel, such that said reed assembly is rotatably secured to said receiving end.

3. The game call as defined in claim 2 wherein said elongated adjustment member includes a first pin inserted within a first bore formed in said annular wall of cylindrical housing, said first pin having a head portion, a shaft portion, and a reed contact surface.

4. The game call as defined in claim 3, wherein said retaining member is a second pin inserted into a second bore formed in said annular wall of said cylindrical housing proximate said receiving end, said second pin having a head portion and a shaft portion.

5. A game call comprising:

an adjustment pin having an elongated shaft portion and a head portion for mechanically varying the emission of sound from said game call;

a substantially cylindrical housing defining an axial bore, said cylindrical housing having a mouthpiece end, a receiving end, and a first bore formed therein for receiving said adjustment pin;

a reed assembly having a reed end and a handle end, said reed end supporting a reed capable of emitting a variable sound in response to passing air and said adjustment pin, said reed assembly detachably and rotatably secured within said receiving end of said cylindrical housing by an annular groove positioned proximate said reed end of said reed assembly, in combination with an axial entrance channel positioned on said reed end of said reed assembly intersecting said annular groove and extending axially towards said reed, and a retaining pin having a head portion and a shaft portion;

said retaining pin inserted within a second bore formed in said housing such that said shaft portion extends substantially perpendicular through said second bore of said housing, such that upon insertion of said reed supporting member into said housing, said retaining pin is guided to said annular groove by said entrance channel, thereby rotatably securing said reed assembly within said receiving end upon subsequent insertion of said adjustment pin.

* * * * *